United States Patent [19]
Saia

[11] 3,755,955
[45] Sept. 4, 1973

[54] OSCILLATING FISH PLANER

[76] Inventor: Carmen Saia, P.O. Box 1295, Bellingham, Wash. 98225

[22] Filed: Sept. 24, 1971

[21] Appl. No.: 183,457

[52] U.S. Cl................ 43/43.13, 43/42.04, 43/42.49
[51] Int. Cl....................... A01k 91/04, A01k 95/00
[58] Field of Search...................... 43/43.13, 43.12, 43/42.04, 42.49, 42.5

[56] References Cited
UNITED STATES PATENTS

| | | | |
|---|---|---|---|
| 3,667,148 | 6/1972 | Dawson | 43/43.13 |
| 3,643,370 | 2/1972 | Cook et al. | 43/43.13 |
| 3,466,787 | 9/1969 | Collins | 43/43.13 |
| 2,716,832 | 9/1955 | Minnie | 43/43.12 |
| 3,570,167 | 3/1971 | Smith | 43/43.13 X |
| 2,220,302 | 11/1940 | Thorne | 43/43.13 |
| 2,273,209 | 2/1942 | Louthan | 43/43.13 |
| 2,932,116 | 4/1960 | Woodzick | 43/42.04 X |
| 3,583,089 | 6/1971 | Scarbro | 43/43.13 |

Primary Examiner—Louis G. Mancene
Assistant Examiner—James H. Czerwonky
Attorney—Seed, Berry & Dowrey

[57] ABSTRACT

A canted U-configuration wire bridle has the legs thereof extended through openings in a dished planer body, the planer held on the wire bridle by suitable means secured to the portions of the legs extending through the planer body. The openings are located on the midline of the body, and are substantially larger than the legs extending therethrough. A lead weight is secured to the lower one of the legs of the bridle. A hook line or lure is secured to the top of the planer body. A trolling or fishing line is slidably attached for movement along the base of the U of the wire bridle. If desired, an elongated rod is pivotally secured to the lower end of the base of the wire bridle and releasably attached to the upper end thereof. The trolling or fishing line is then slidably attached for movement along the elongated rod. Pulling on the trolling line with a predetermined force releases the rod and allows the fish planer to rise to the surface along with the hook or lure.

10 Claims, 4 Drawing Figures

PATENTED SEP 4 1973
3,755,955
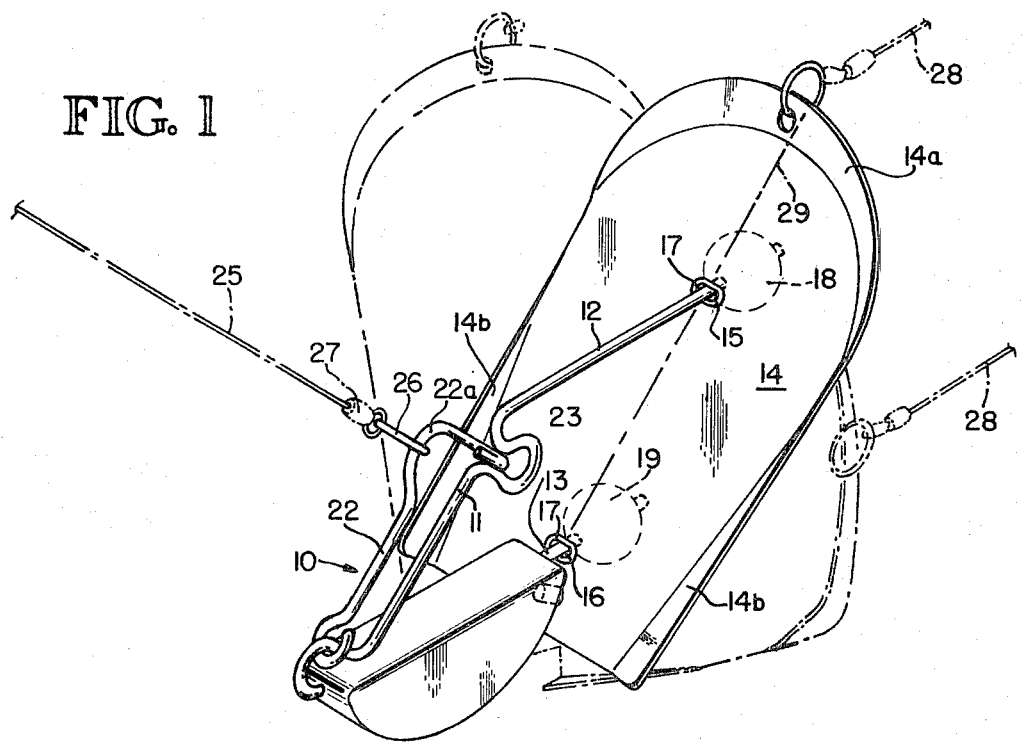
FIG. 1
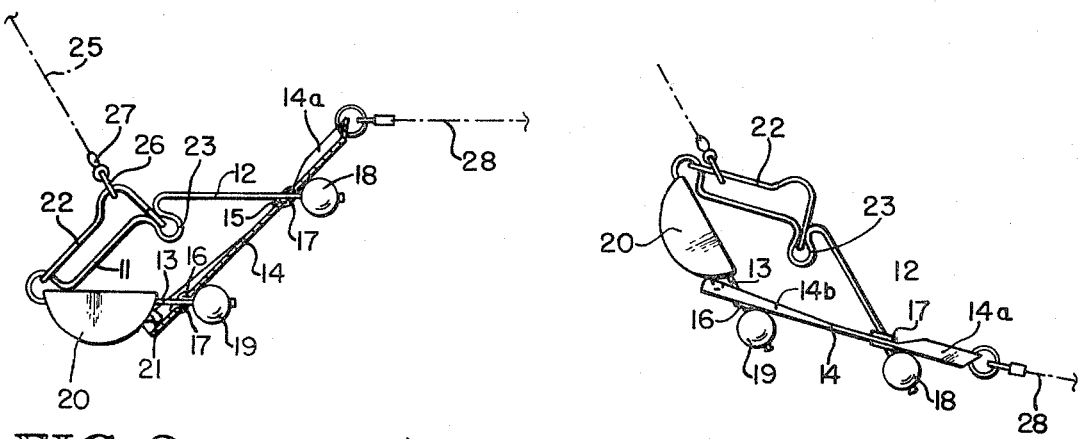
FIG. 2
FIG. 3
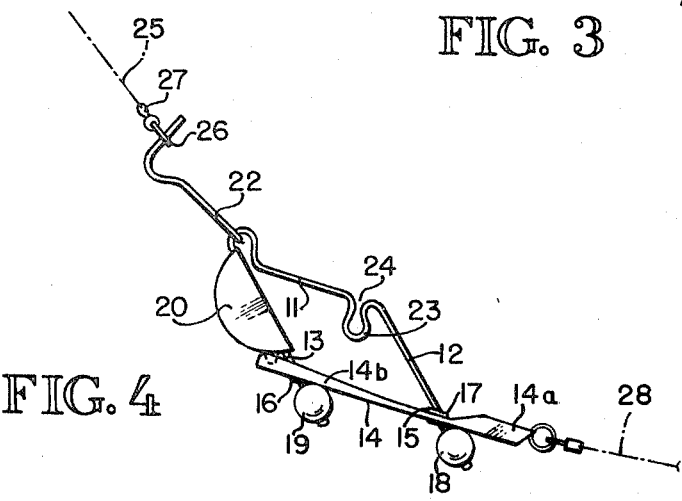
FIG. 4

OSCILLATING FISH PLANER

BACKGROUND OF THE INVENTION

1. Field of the Invention

This invention relates to an oscillating planer for use in trolling where fishing is generally done at considerable depth.

2. Prior Art Relating to the Disclosure

Numerous planers are known for carrying the hook line or lure during trolling to a depth where the fish can be found. Such fish planers are designed to trip when the fish strikes and thus allow the fish to be easily brought to the surface. Typical of such fish planers are those described and illustrated in U.S. Pat. Nos. 2,220,302; 2,247,583; 2,273,209; 2,789,386; 3,447,255; and 3,466,787.

SUMMARY OF THE INVENTION

This invention relates to an oscillating trolling device comprising (1) an elongated bridle extending the lengthwise direction of the planer body connectable to a trolling line, (2) a planer body disposed beneath the bridle and pivotally connected thereto for oscillation in a direction essentially transverse to the direction of pull of the device through the water, (3) means for connecting a hook line to the planer body near its upper end, (4) ballast means beneath the forward portion of the planer body, and (5) means connecting a trolling line to the bridle, the trolling line slidable along a portion of a length of the bridle. The planer device is adapted, when a predetermined pull is exerted on the lure or hook line, to swing the planer body from a downwardly and forwardly inclined position to an upwardly and backwardly inclined position for recovery of the fish.

The subjects of this invention are: (1) to provide a trolling device which oscillates as it is pulled through the water and thus attracts fish; (2) to provide a trolling device device which can be tripped by the fisherman at any desired time to cause the device to ascend to the surface of the water; (3) to provide a trolling device wherein the planer body therof is loosely mounted to a wire bridle for oscillation relative thereto; and (4) to provide a trolling device having a two way release action.

BRIEF DESCRIPTION OF THE DRAWINGS

FIG. 1 is a perspective view of the trolling device, the phantom lines illustrating the manner in which the device oscillates as it is pulled through the water;

FIG. 2 is a partial cross-sectional view of the trolling device in trolling position and illustrating the manner of attachment of the planer body to the wire bridle;

FIG. 3 is a side view of the trolling device in the position assumed when a fish strikes the hook line; and FIG. 4 is a side view of the trolling device in the position assumed when the fisherman, by exerting a predetermined amount of force on the trolling line, trips the release mechanism.

DESCRIPTION OF THE PREFERRED EMBODIMENTS

Referring to FIG. 1, a bridle 10 in the form of a canted letter U has a base 11 and legs 12 and 13 extending outwardly from the base. A planar body 14 of greater length than width is loosely secured to the legs of the bridle so that it is free to oscillate relative thereto. The legs 12 and 13 extend through openings 15 and 16 in the planer body, the openings being larger than the cross-sectional diameter of the legs. The openings are preferably fitted with elastomeric grommets 17. The openings are preferably located along a midline 29 running the length of the planer body midway of the width thereof. The upper terminating edge of a portion of the side terminating edges of the planer body are preferably curved as shown to form flange portions 14a and 14b. Action of the water against the planer body, as it is pulled through the water, causes the planer body to oscillate back and forth between the positions shown in phantom in FIG. 1.

The planer body is loosely attached to the legs of the bridle by suitable retaining means such as the spherical elements 18 and 19 slipped over the portions of the legs extending through the planer body, the elements retained on the legs by flattening the terminal edges of the legs 12 and 13. The arcuate surface of the spherical elements against which the planer body rests as it is pulled through water in the trolling position illustrated in FIGS. 1 and 2 provides a surface about which the planer body pivots for oscillation.

A heavy weight 20 of lead or other suitable material is secured over the lower leg 13 as illustrated. Preferably, the portion of the weight adjacent to planer body has a protruding bump 21 which contacts the front surface of the planer body near the lower end thereof. The bump 21 aids in holding the planer body against the spherical elements 18 and 19 and also provides a pivot point about which the planer body oscillates.

A release or tripping mechanism may be provided so that the fisherman may, at any desired time, trip the trolling device by pulling on the trolling line with a predetermined force to allow the device and hook to ascend to the surface. The release mechanism is adjustable as to the amount of force required to effect release. The release mechanism comprises an elongated rod 22 pivotally secured to the lower end of the base 11 of the bridle 10. The upper end of the rod 22 is releasably secured near the upper end of the base 11 in the manner illustrated or by other suitable means. As illustrated a portion 23 of the base 11 near the upper end is pinched together. The upper terminal end of rod 22 is curved to form a U-shaped end which engages or snaps between the pinched-together part of the base 11. The amount of force necessary to release rod 22 is adjusted by adjusting the space 24 between the pinched-together portions of base 11.

A fishing or trolling line may be secured to the base 11 of the bridle or to the elongated rod 22 making up a part of the release mechanism just described. The trolling line is preferably slidably attached to either the rod 22 or base 11 by a ring 26 secured to the end of the line 25 by swivel 27. The trolling line slides between a trolling position illustrated in FIGS. 1 and 2 to the strike position illustrated by FIG. 3 and the release position illustrated by FIG. 4. The upper portion of rod 22 has an outwardly curved jog 22a therein which prevents the ring 26 from sliding down the rod when slack occurs in the trolling or fishing line 25.

The lure or hook line 28 is attached to the planer body at or near the upper end thereof.

When the trolling device of this invention is pulled through the water in the position illustrated by FIGS. 1 and 2 the pressure of the water against the downwardly and forwardly inclined planer body 14 causes it to oscillate about its midline 29 as well as between the positions shown in phantom in FIG. 1. The planer body may be made of any suitable material but is preferably cut from a sheet of planer, non-corrosive material provided with a highly reflective surface for attracting fish. Additionally the action of water results in submersion of the device until a level is reached where the action of the planer body is overcome by the upward pull of the trolling line 25. The trolling device maintains this level until a fish strikes exerting a force on the hook line 28 or the fisherman trips the release mechanism to raise the trolling device to the surfaced. If a fish strikes the weight of the fish is transferred through the line 28 to the upper portion of the planer body 14 causing it to rotate about its axis from the downward and forwardly inclined position to an upward and rearwardly inclined position as shown in FIG. 3. In this position the planer body will effect raising of the hook line to assist in surfacing the fish. At the same time the ring 26 slides down the rod 22 to the point of pivotal connection of the rod 22 to base 11. If a fish should escape the planer body can be re-set to the trolling position illustrated by FIGS. 1 and 2 by paying out sufficient line until it is slack, thereby allowing ring 26 to slide up rod 22 to lodge in the outwardly curved jog 22a. If the fisherman desires to pull in his line at any time, a jerk of predetermined force on the trolling line 25 will disengage rod 22 allowing the planer body to assume the position illustrated in FIG. 4 and causing the trolling device and hook to rise to the surface.

The area and configuration of the planer body, the amount of weight attached to the trolling device and other factors have a bearing of the depth to which the trolling device will descend. These can be adjusted according to personal preference.

The embodiments of the invention in which an exclusive property or privilege is claimed are defined as follows:

1. An oscillating trolling device comprising:
 a rigid, elongated bridle extending the lengthwise direction of the trolling device connectable to a trolling line,
 a planer body having openings along its midline and being disposed beneath the bridle, the end portions of said bridle extending through said openings and being loosely connected thereto, said openings being substantially larger than the cross-sectional area of said end portions, for oscillation in a plane essentially transverse to the direction of pull of the trolling device through the water,
 means for connecting a hook line to the planer body at essentially the upper end thereof,
 ballast means secured to the trolling device near one end thereof, and
 release means slidably connecting a trolling line to the bridle, the trolling device adapted, when a predetermined pull is exerted on a hook line, to swing the planer body from a downwardly and forwardly inclined position to an upwardly and rearwardly inclined position as said trolling lines slides along said release means.

2. The trolling device of claim 1 wherein the planer body is curved at the upper terminating edge thereof.

3. The trolling device of claim 1 wherein the bridle includes release means so that when a predetermined pull is exerted on a trolling line, the planer body swings to an upwardly inclined position causing the trolling device and hook line to ascend to the surface of the water.

4. The trolling device of claim 1 wherein the bridle is an elongated rod in the form of a canted letter U having a base portion and wherein said end portions comprise integral extending legs with the legs thereof extending through openings along the midline of the planer body, and means loosely retaining the planer body to the legs of the bridle.

5. The trolling device of claim 4 wherein the ballast means is secured to one leg of the bridle below the center of gravity of the device.

6. The trolling device of claim 4 wherein the release means comprises an elongated rod essentially paralleling the base portion of the U-shaped rod, the elongated rod of the release means pivotally attached to said U-shaped rod at one end and releasably attached to said U-shaped rod at the other end, the trolling means attached to the elongated rod of the release means for slidable movement therealong.

7. The trolling device of claim 2 wherein the planer body has upwardly curved side edges.

8. An oscillating trolling device comprising:
 an elongated rod rigid in the form of a canted letter U having a base portion and integral extending legs; two openings therein along a midline extending the length of the body for loosely receiving the legs of the U-shaped rod therethrough, said openings being substantially larger than the cross-sectional area of said legs so that when the planer body is pulled through the water in a downwardly and forwardly inclined position, it is free to oscillate about the points of pivotal connection to the bridle;
 means loosely retaining the planer body to the legs of the rod;
 means connecting a hook line to the planer body at the upper end thereof;
 ballast means secured to one leg of the U-shaped rod below the center of gravity of the device; and
 means connecting a trolling line to the rod for slidable movement along the base portion of the elongated rod, the planer body (1) in trolling position assuming a downwardly and forwardly inclined position causing the planer to be drawn downwardly in the water to lower the fishing lure to a desired depth, and (2) in strike position wherein the weight of the fish is on the hook line assuming an upwardly and forwardly inclined position causing the trolling device and the lure to ascend to the surface.

9. The trolling device of claim 8 wherein the upper terminating edges of the planer body are dished.

10. The trolling device of claim 8 including a release mechanism comprising an elongated rod essentially paralleling the base portion of the U-shaped rod, the elongated rod of the release means pivotally attached to said U-shaped rod at one end thereof and releasably attached to said U-shaped rod at the other end, the trolling means slidably attached to the elongated rod of the release mechanism.

* * * * *

UNITED STATES PATENT OFFICE
CERTIFICATE OF CORRECTION

Patent No. 3,755,955　　　　　　　　　Dated Sept. 4, 1973

Inventor(s) Carmen Saia

It is certified that error appears in the above-identified patent and that said Letters Patent are hereby corrected as shown below:

Claim 8, line 2, insert -- rigid -- before "rod" and delete "rigid" after "rod"; line 4, after "legs;" add -- a planar body of greater length than width having --.

Signed and sealed this 29th day of October 1974.

(SEAL)
Attest:

McCOY M. GIBSON JR.　　　　　　　　　C. MARSHALL DANN
Attesting Officer　　　　　　　　　　Commissioner of Patents